United States Patent
Duvall et al.

(10) Patent No.: US 12,356,970 B1
(45) Date of Patent: Jul. 15, 2025

(54) FISHING LURE WITH REFLECTIVE SURFACE

(71) Applicant: Plastic Research and Development Corporation, Birmingham, AL (US)

(72) Inventors: Tyler Duvall, Alma, AR (US); Chad Warner, Muldrow, OK (US)

(73) Assignee: PLASTIC RESEARCH AND DEVELOPMENT CORPORATION, Birmingham, AL (US)

( * ) Notice: Subject to any disclaimer, the term of this patent is extended or adjusted under 35 U.S.C. 154(b) by 0 days.

(21) Appl. No.: 18/609,961

(22) Filed: Mar. 19, 2024

(51) Int. Cl.
*A01K 85/01* (2006.01)
*A01K 85/02* (2006.01)
*A01K 85/16* (2006.01)

(52) U.S. Cl.
CPC .......... *A01K 85/012* (2022.02); *A01K 85/024* (2022.02); *A01K 85/16* (2013.01)

(58) Field of Classification Search
CPC .............................. A01K 85/013; A01K 85/01
See application file for complete search history.

(56) References Cited

U.S. PATENT DOCUMENTS

| | | | |
|---|---|---|---|
| 2,945,318 | A | 7/1960 | Lassiter |
| 4,215,507 | A | 8/1980 | Russell |
| 6,041,540 | A * | 3/2000 | Potts ...................... A01K 85/00 43/42.47 |
| 6,101,758 | A | 8/2000 | Finley |
| D679,362 | S | 4/2013 | Vedder |
| 9,066,505 | B1 | 6/2015 | Vedder |
| 10,194,646 | B2 | 2/2019 | Walsh et al. |
| 10,470,447 | B2 | 11/2019 | Takahashi |
| 10,925,269 | B2 * | 2/2021 | Etienne-Cummings ..................... G01S 15/89 |

(Continued)

FOREIGN PATENT DOCUMENTS

| | | |
|---|---|---|
| CN | 103213248 A | 7/2013 |
| EP | 3128832 A2 | 10/2015 |

(Continued)

OTHER PUBLICATIONS

Joseph Simonds; Salt Strong; The Rechargeable Fishing Lure That Guaranteed A Strike Every Cast!; Salt Strong; retrieved from https://www.saltstrong.com/articles/twitching-lure/ on Mar. 22, 2024.

(Continued)

*Primary Examiner* — Christopher P Ellis
(74) *Attorney, Agent, or Firm* — Jake M. Gipson; Stephen H. Hall; Bradley Arant Boult Cummings LLP

(57) ABSTRACT

An embodiment of an improved fishing lure comprises a fishing lure body having an approximately flat surface on the top side or bottom side of the body and a blade statically affixed to the approximately flat surface. The lure body may include a recess having a wall and a base, wherein the approximately flat surface is at the base of the recess, and wherein around a portion of the perimeter of the recess at least one lip extends inward from the wall of the recess. The blade is preferably disposed in the recess and below the at least one lip. In some embodiments, the approximately flat surface has a float angle between about 30 degrees and about 90 degrees relative to horizontal, and more preferably between about 35 degrees and about 45 degrees relative to horizontal.

20 Claims, 15 Drawing Sheets

(56) References Cited

U.S. PATENT DOCUMENTS

| | | | |
|---|---|---|---|
| D931,976 S | 9/2021 | Chan | |
| 11,484,017 B2 | 11/2022 | Hajjar | |
| 11,589,565 B1 | 2/2023 | Chan | |
| 2015/0075058 A1 | 3/2015 | Stecher | |
| 2022/0039363 A1 | 2/2022 | Kawasaki et al. | |
| 2022/0394962 A1* | 12/2022 | Medinas | A01K 85/12 |
| 2023/0012718 A1* | 1/2023 | Van Heerden | A01K 85/015 |
| 2023/0065290 A1* | 3/2023 | Yagi | G02B 5/12 |
| 2023/0095841 A1 | 3/2023 | Langley et al. | |
| 2023/0122035 A1* | 4/2023 | Yagi | A01K 85/1847 43/42.33 |
| 2024/0138392 A1* | 5/2024 | Bethshears | G01S 15/89 |

FOREIGN PATENT DOCUMENTS

| JP | 2015530085 A | 10/2015 |
|---|---|---|
| WO | 2014032182 A1 | 3/2014 |

OTHER PUBLICATIONS

Bass Pro Shops; Lunkerhunt Boshi Blade; retrieved from "https://www.basspro.com/shop/en/lunkerhunt-boshi-blade?hvarAID=shopping_googleproductextensions&ds_e=GOOGLE&ds_c=BPS%7CShopping%7CPMax%7CFishing%7CGeneral%7CNAud%7CNVol7CNMT&gad_source=1&gclid=EAlalQobChMI_Z6ns4PqggMVMIFaBR0ZSAouEAQYBCABEglmu_D_BwE&gclsrc=aw.ds" on Mar. 27, 2024.

Fishusa America's Tackle Shop; Bill Lewis Scope Stik Suspending Jerkbait; retrieved from "https://www.fishusa.com/Bill-Lewis-Scope-Stik-Suspending-Jerkbait/" on Mar. 27, 2024.

International Search Report and Written Opinion for International application No. PCT/US2025/010038 dated Feb. 27, 2025.

* cited by examiner

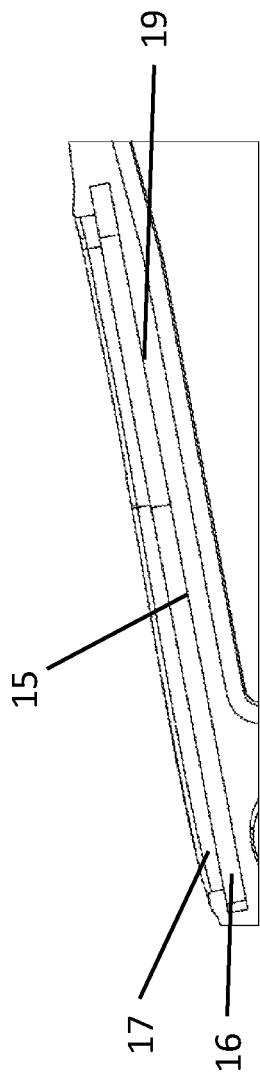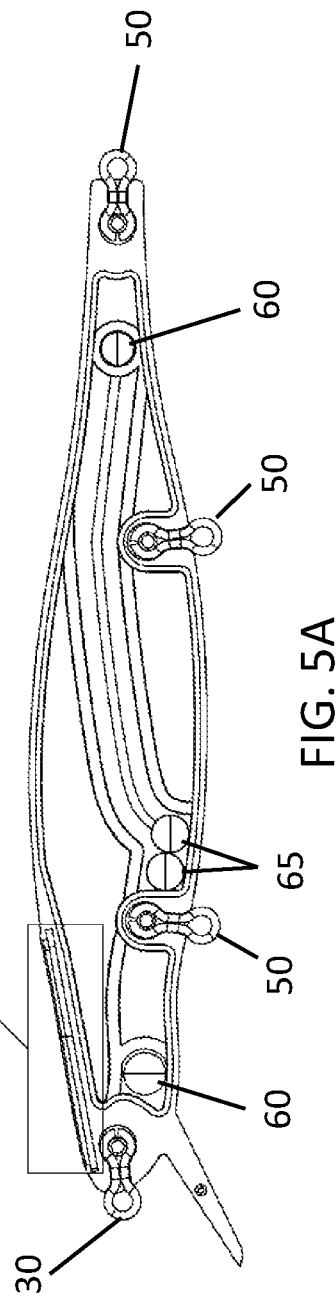

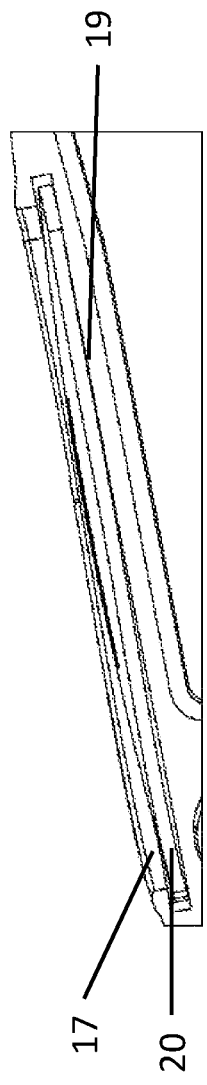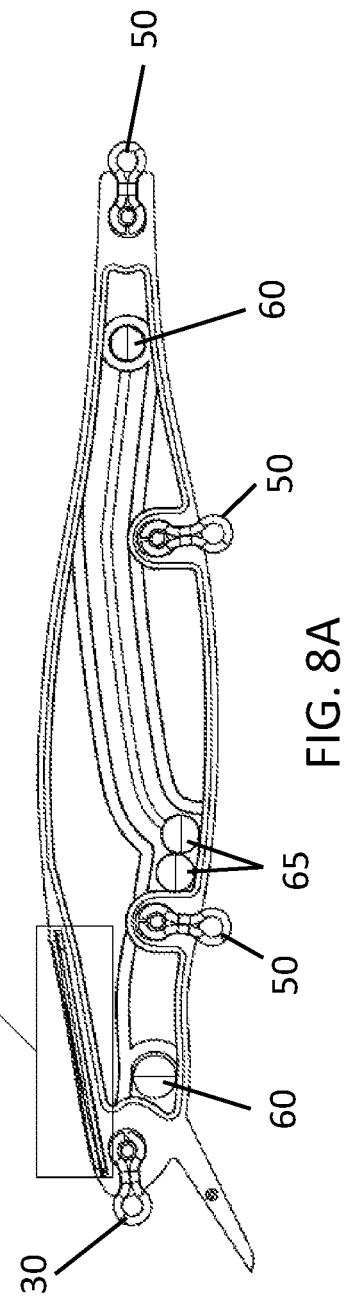

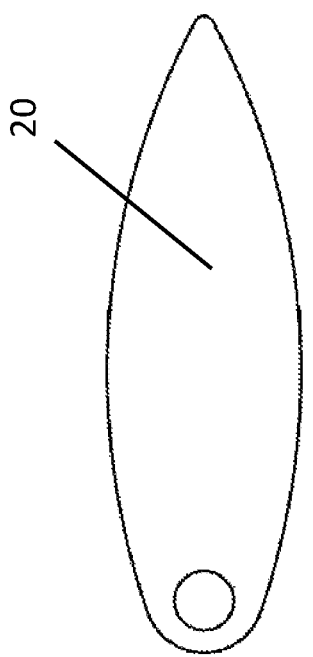 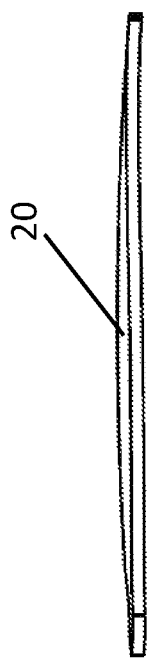
FIG. 11A
FIG. 11B

FISHING LURE WITH REFLECTIVE SURFACE

FIELD OF INVENTION

This disclosure relates to fishing lures and, more particularly, to fishing lures having a surface reflective of sonar, light, or both.

BACKGROUND

Sonar technology has long been used in connection with various types of fishing. The data obtained from sonar allows a fisherman to see the bottom, the cover where fish may hide, the game fish, bait fish, and even, in some cases, a fisherman's lure. Sonar has traditionally been used to view what is below a fishing vessel or, more recently, what is on the sides of a moving vessel. But forward-facing sonar technology now allows fisherman to use sonar to view what is in front of a vessel.

Although it is possible to see certain lures on sonar, it is often challenging to do so. Many lures provide an insignificant or minimal sonar return because they are too small, are constructed from a material that provides a poor sonar return, or are shaped in a way that reduces the amount of sonar return. This problem may be particularly pronounced with forward facing sonar and lures constructed from a plastic or other less dense material. Lures constructed from such materials are popular for many styles of lures, but they tend to reflect less of a sonar return.

Other lures, although possible to discern on forward-facing sonar, may be difficult to detect unless the sonar transducer is perfectly aligned in the direction of the lure. This difficulty arises because, even though the sonar transducer may have a larger cone in which it receives a return from objects in the water, the return generated by the lure may be insignificant or minimal on the peripheries of that cone. In addition, even for lures that produce a more significant return, they can still be difficult to observe on forward-facing sonar. While fishing, the sonar transducer is often rotated constantly in different directions, and the vessel is constantly moving with the wind, current, and its own power. As a result, due to the smaller sonar return generated by a fishing lure (as compared, for instance, to a fish's sonar return), the lure may be difficult to detect during the constant movement of the transducer and motion of the vessel.

In addition to considerations related to detection of a lure on sonar, fishing lures often include various features and components to impart flash that may attract fish. This visual feature can provide many benefits, such as allowing predator fish to detect the fishing lure at a greater distance, mimicking the visual appearance of bait fish, and triggering otherwise inactive (or non-feeding) fish to strike.

One common technique for adding flash to a lure is adding one or more metal blades. These blades are often attached to a lure by a wire that extends away from the body of the lure and allows the blade to rotate or spin as the lure is pulled through the water, generating the desired flash. In some instances, the blades are attached to a swivel to facilitate rotation, but in other instances, the blades rotate around the wire itself.

Although such blades may impart the desired flash, they have several drawbacks. The existence of rotating blades increases the amount of drag as the lure is pulled through the water. This drag may change the speed at which a lure may be retrieved and may also cause the lure to rise in the water column. In addition, the blades may decrease the weedless properties of a lure. For instance, the blade, wire, or swivel may become fouled with weeds or other debris, which causes the blade to stop rotating.

A need therefore exists for an improved fishing lure that provides increased reflectivity of sonar signals, visual light, or both. Advantageously, the improved fishing lure will provide improved returns on forward-facing sonar, even when the lure is constructed using existing compositions or shapes that provide insignificant or minimal sonar returns. Preferably, the improved fishing lure will also provide increased flash without significantly changing the retrieve characteristics of a lure or affecting its weedlessness.

SUMMARY

This disclosure describes an improved fishing lure having a reflective surface. Advantageously, some embodiments of the improved fishing lure are configured to increase the sonar return of the fishing lure, particularly in combination with forward-facing sonar. These embodiments may include a reflective surface comprising an approximately flat surface on the lure body and a blade constructed from a denser material that is affixed to the approximately flat surface. Preferably, the reflective surface in some embodiments of the improved fishing lure May also increase the visual flash of the lure. Embodiments of the invention may satisfy one or more, but not necessarily all, of the needs and capabilities discussed throughout this disclosure.

In some embodiments, the improved fishing lure comprises a fishing lure body having a front end, a rear end, a top side, and a bottom side, wherein the fishing lure body comprises an approximately flat surface on the top side and proximate to the front end; a bill extending forward and downward from the front end; at least one hook extending from the rear end or the bottom side; a line tie extending from the fishing lure body proximate to the front end; and a metal blade statically affixed to the approximately flat surface. In certain variations of this embodiment, the lure body includes a recess having a wall and a base, wherein the approximately flat surface is at the base of the recess, and wherein around a portion of the perimeter of the recess at least one lip extends inward from the wall of the recess. In those embodiments, the metal blade is preferably disposed in the recess and below the at least one lip. Alternatively or additionally, the approximately flat surface has a float angle between about 30 degrees and about 90 degrees relative to horizontal, and more preferably between about 35 degrees and about 45 degrees relative to horizontal.

In another embodiment, the improved fishing lure comprises a fishing lure body having a front end, a rear end, a top side, and a bottom side, wherein the fishing lure body comprises an approximately flat surface on the top side or the bottom side; at least one hook extending from the rear end or the bottom side; a line tie extending from the fishing lure body proximate to the front end; and a metal blade affixed to the approximately flat surface, wherein the planar surface of the metal blade is substantially coplanar with the planar surface of the approximately flat surface. In some specific embodiments, the approximately flat surface is recessed in the fishing lure body.

The above summary presents a simplified overview to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF THE DRAWINGS

The following drawings are attached to and form a portion of this disclosure:

FIG. 5A: A side view of one embodiment of the improved fishing lure, with the blade removed to show the approximately flat surface and one half of the fishing lure removed to show the internal detail of the fishing lure.

FIG. 5B: A detail view taken from the side view of FIG. 5A showing the detail of the approximately flat surface and the blade-retaining lip.

FIG. 8A: A side view of one embodiment of the improved fishing lure, with one half of the fishing lure removed to show the internal detail of the fishing lure.

FIG. 8B: A detail view taken from the side view of FIG. 8A showing the detail of the approximately flat surface, the blade, and the blade-retaining lip.

FIG. 11A: A top view of a metal blade in one embodiment of the improved fishing lure.

FIG. 11B: A side view of a metal blade in one embodiment of the improved fishing lure.

DEFINITIONS

Figure 1:
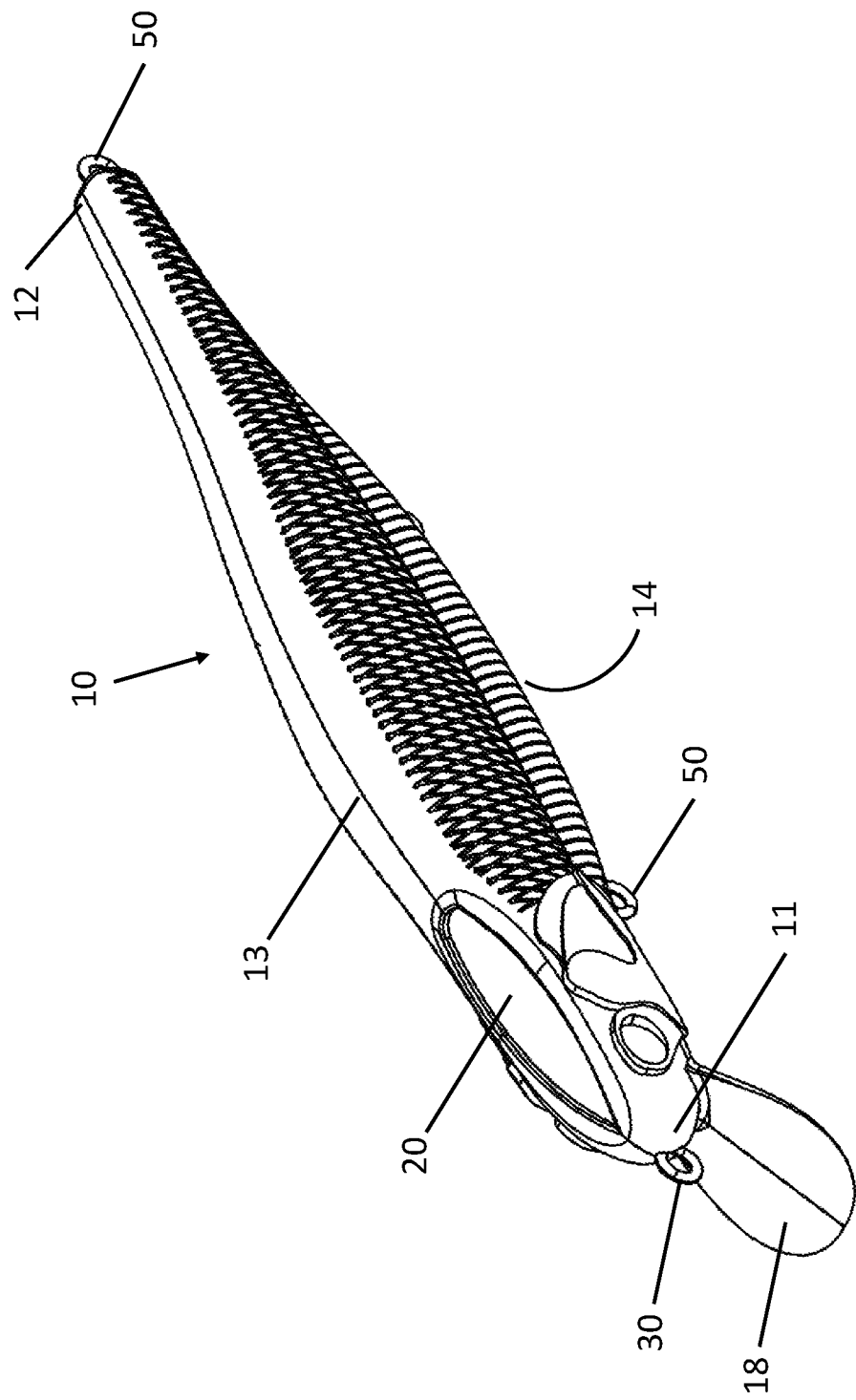
FIG. 1: A perspective view of one embodiment of the improved fishing lure.
Figure 2:
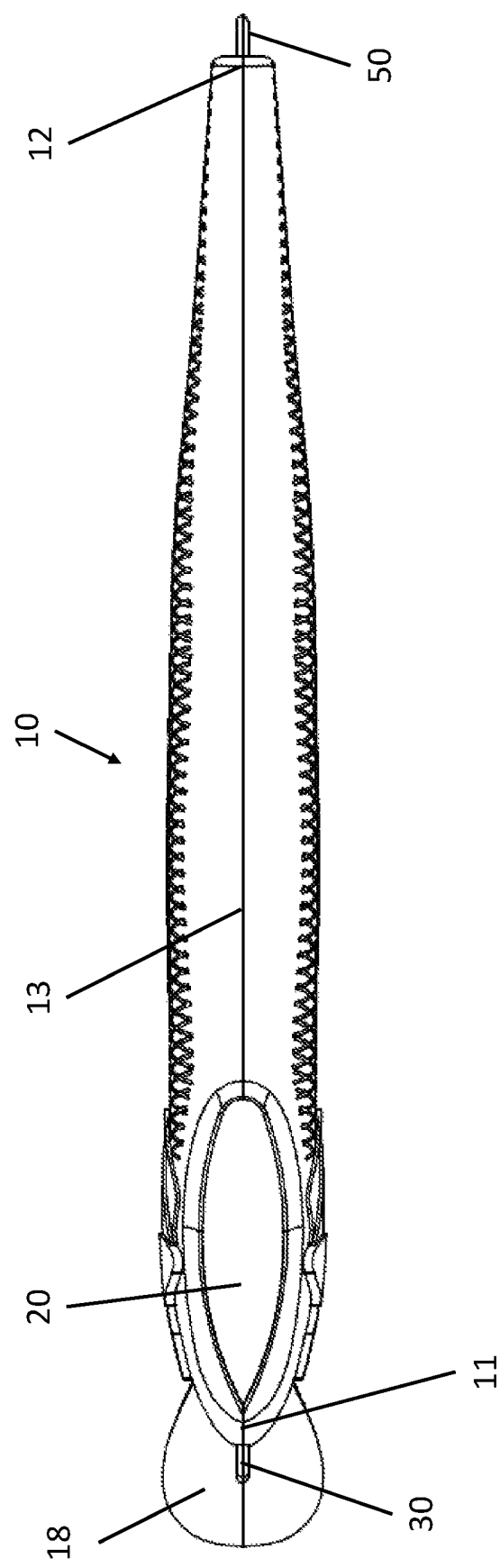
FIG. 2: A top view of one embodiment of the improved fishing lure.
Figure 3:
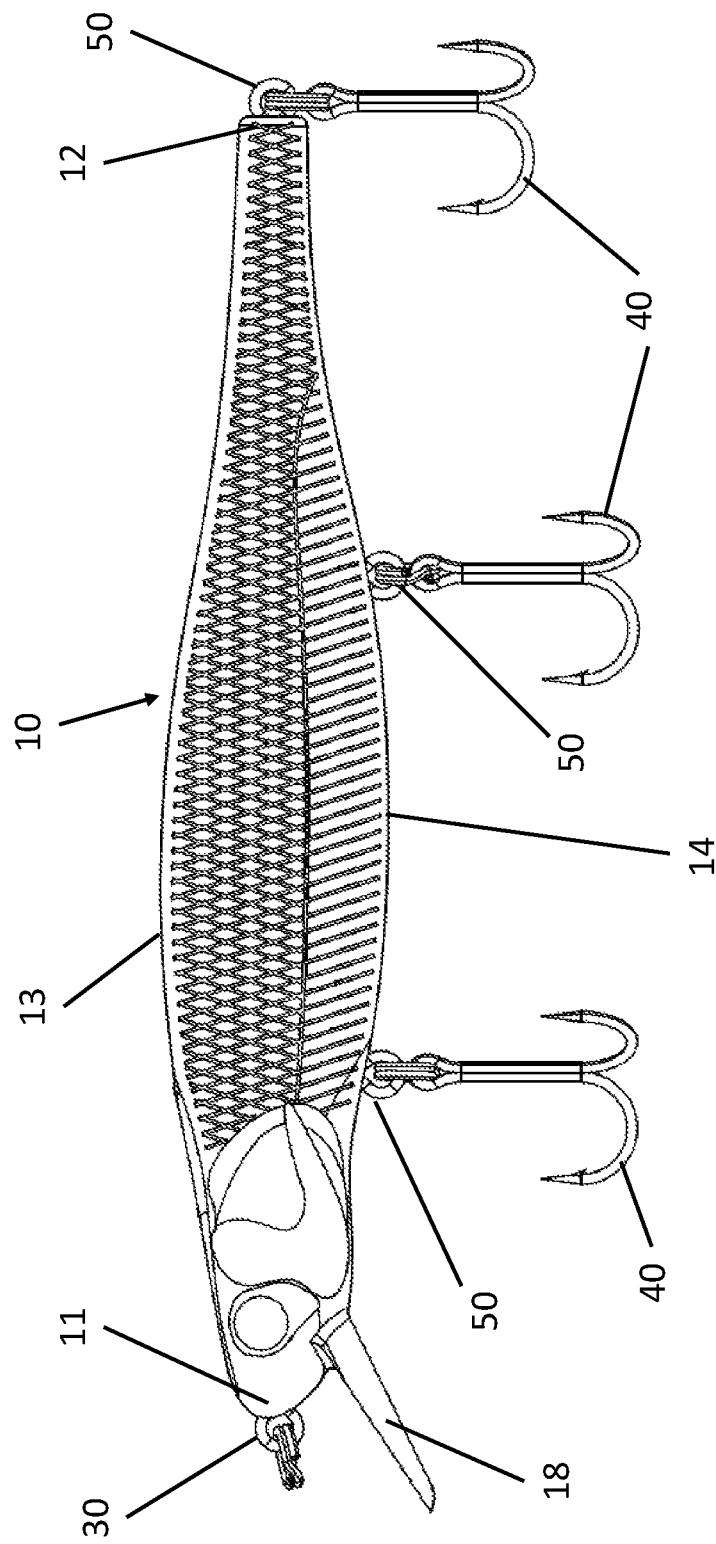
FIG. 3: A side view of one embodiment of the improved fishing lure with treble hooks installed on each hook hanger.
Figure 4:
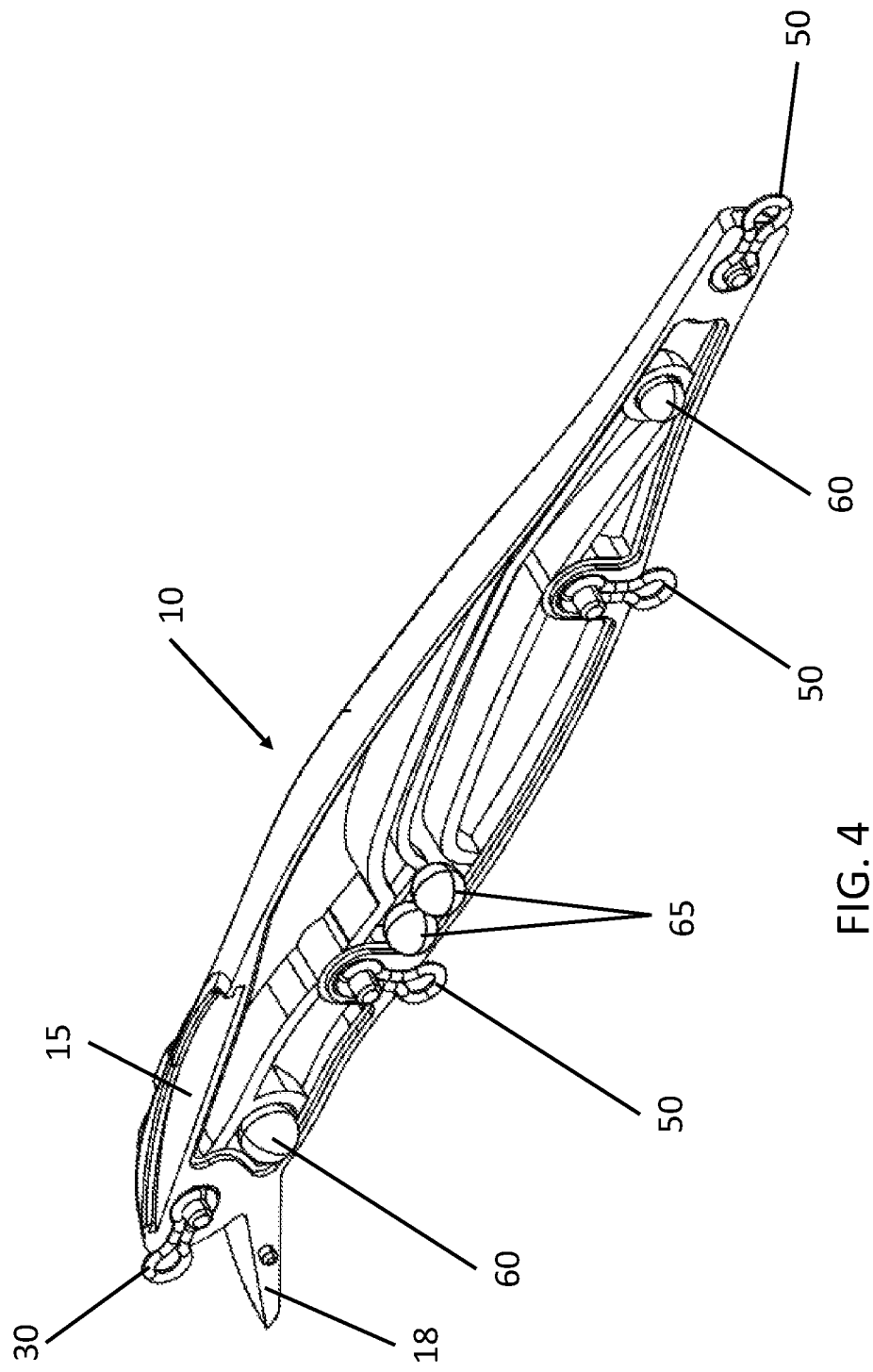
FIG. 4: A rear perspective view of one embodiment of the improved fishing lure, with the blade removed to show the approximately flat surface and one half of the fishing lure removed to show the internal detail of the fishing lure.
Figure 6:
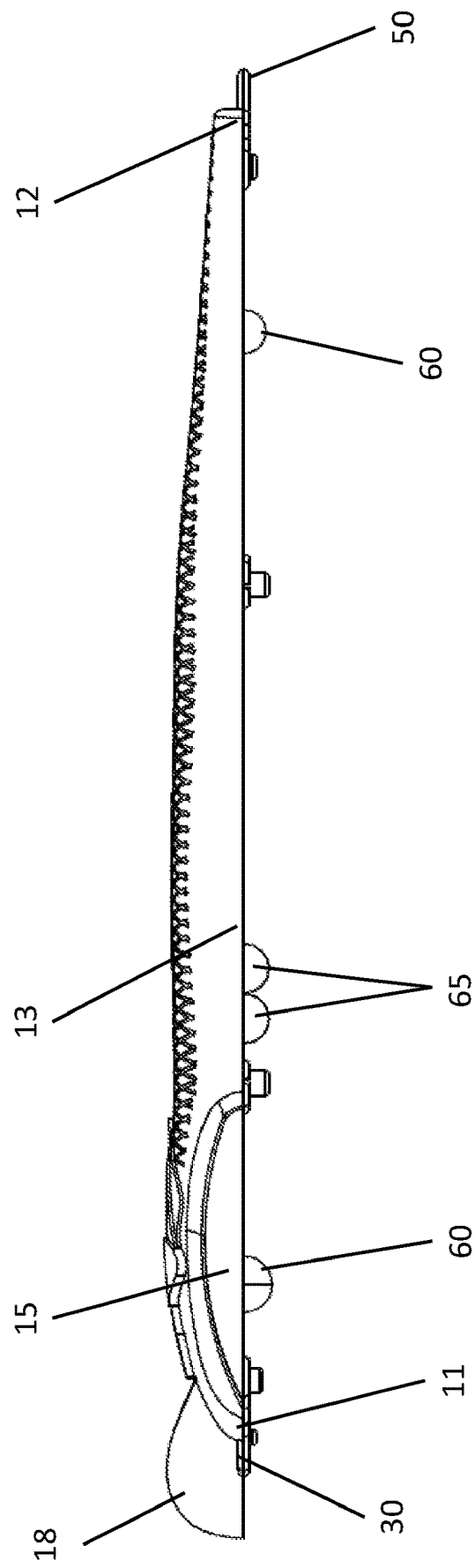
FIG. 6: A top view of one embodiment of the improved fishing lure, with the blade removed to show the approximately flat surface and one half of the fishing lure removed to show the internal detail of the fishing lure.

Unless otherwise defined, all terms (including technical and scientific terms) in this disclosure have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly defined otherwise in this disclosure. Well known functions or constructions May not be described in detail for brevity or clarity.

The terms "about" and "approximately" shall generally mean an acceptable degree of error or variation for the quantity measured in light of the nature or precision of the measurements. Numerical quantities given in this description are approximate unless stated otherwise, meaning that the term "about" or "approximately" can be inferred when not expressly stated.

The terminology used throughout the disclosure is for the purpose of describing particular embodiments only and is not intended to be limiting. The singular forms "a", "an," and "the" are intended to include the plural forms as well, unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The following description illustrates and describes the processes, machines, manufactures, compositions of matter, and other teachings of the present disclosure. The disclosure shows and describes only certain embodiments of the processes, machines, manufactures, compositions of matter, and other teachings disclosed, but as mentioned above, it is to be understood that the teachings of the present disclosure are capable of use in various other combinations, modifications, and environments and are capable of changes or modifications within the scope of the teachings of this disclosure, commensurate with the skill and knowledge of a person having ordinary skill in the relevant art. The embodiments described are further intended to explain certain best modes known of practicing the processes, machines, manufactures, compositions of matter, and other teachings of the disclosure and to enable others skilled in the art to utilize the teachings of the disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

DETAILED DESCRIPTION

An improved fishing lure with a reflective surface has been developed and is described. As shown in the drawings, the improved fishing lure has the general construction and characteristics of any of a wide variety of hard-bodied fishing lures. As generally described in this disclosure, the fishing lure is constructed from a material comprising a hard plastic or wood. But the teachings are not limited to such fishing lures. The improved fishing lure may be constructed from other materials and be a lure of other body shapes. For instance, the improved fishing lure with a reflective surface may be a soft plastic lure, a wire bait (e.g., spinnerbait or buzz bait), or a jig style lure (e.g., a flipping jig or a swim jig). In other words, the teachings of this disclosure may be advantageous for use with any fishing lure where it is desirable to improve the lure with a reflective surface increasing the lure's sonar return or visual flash.

One exemplary embodiment of the improved fishing lure is shown in FIGS. 1-10. In this embodiment, the fishing lure comprises a lure body 10, an approximately flat surface 15 on the body 10, and a blade 20 affixed to the approximately flat surface 15. A line tie 30 extends from the fishing lure body 10, and at least one hook 40 extends from the fishing lure body 10. Numerous variations of the improved fishing lure are possible. Each component and the many variations of the lure are further described below.

The lure body 10 may be any suitable shape and size. Examples of suitable lure body shapes include lure bodies having the general shape of a jerkbait, a crankbait, a lipless bait, a topwater lure, a minnow bait, a jointed swimbait, or a glide bait. In these various embodiments, the lure body 10 has a front end 11, a rear end 12, a top side 13, and a bottom side 14. Generally speaking, the front end 11 is identified as the leading end of the lure when retrieved through the water, and the top side 13 is identified as the top side of the lure when the lure is at rest in water.

The lure body 10 is preferably rigid and may be constructed from any suitable material, such as plastic or wood. In one particular embodiment, the lure body 10 comprises a hard plastic, such as acrylonitrile butadiene styrene (ABS), polycarbonate, polypropylene, or butyrate. The plastic may be formed from a clear resin or a resin in any variety of colors. In many instances in which the lure body 10 comprises a hard plastic, the lure body 10 is molded in two complementary halves, with an example of one such half shown in FIGS. 4-9. The lure body 10 may then be assembled by joining the two halves together. The halves may be secured together by sonic welding, a mechanical connection (such as features that snap together), by an adhesive, or by a combination of those and other known attachment means. But in other embodiments, the lure body 10 may be molded or constructed from a single piece.

In the exemplary embodiment shown in FIGS. 1-10, the lure body 10 is generally shaped like a jerkbait. In this embodiment, the lure body 10 is slender and elongated in shape, with the lure body tapering towards both ends 11, 12. The lure body 10 may optionally include eyes molded into the body or affixed to the lure body 10. The lure body 10 may also optionally include various details and features along its external surface to mimic the appearance of scales, gills, or other characteristics of prey fish. Various paints or other coatings may be applied to the exterior of the lure body 10 to mimic the appearance of baitfish or otherwise appear to the predatory instincts of predatory fish.

Proximate to the front end 11, at least one line tie 30 extends from the fishing lure body 10. The line tie 30 allows an angler to secure his fishing line to the fishing lure and ordinarily has a shape that is generally circular or ovular. In an exemplary embodiment, the line tie 30 is a wire form embedded in the lure body 10 or disposed between the two halves of the lure body 10, such as shown in FIGS. 4-9.

At least one hook 40 extends from the lure body 10. The one or more hooks 40 preferably extend from the bottom side 14 or the rear end 12 of the lure body 10, but in some embodiments, the hooks may extend from the tip side, the lateral sides, or even the front end of the lure body 10. The hooks 40 may be treble hooks or single hooks. In some embodiments, the hooks 40 are attached to the lure body 10 via one or more hook hangers 50. The hook hangers 50 may comprise a wire form embedded in the lure body 10 or disposed between the two halves of the lure body 10, such as shown in FIGS. 4-9. Alternatively, in some embodiments, a single wire form may extend through the lure body 10 and form multiple hook hangers and, in some instances, also the line tie 30.

The fishing lure body 10 may also include various internal features to control the action and other characteristics of the assembled fishing lure. Depending on the material from which the fishing lure body 10 is constructed and the internal structure of the body 10 (e.g., internal chambers filled with air or other buoyant material), the fishing lure body 10 may be relatively light and naturally buoyant. To improve castability and control the buoyancy of the assembled fishing lure, one or more weights 60, 65 are often embedded in the fishing lure body 10. The weights May comprise a metal, such as lead or tungsten. Some of the weights 60 may be statically located in the lure body 10, while other weights 65 are disposed in an internal chamber that allows for some degree of movement. The weights 65 disposed in an internal chamber may create rattling or other noise to attract fish. Additionally or alternatively, the internal chamber may be arranged so that the weights shift during the process of casting, which improves castability.

In some particular embodiments, such as certain versions of the embodiment shown in FIGS. 1-9, the lure body 10 is weighted so that the assembled lure (including hooks 40 and blade 20) will suspend in the water column when the water temperature is within a certain range. For instance, in some embodiments the assembled lure suspends at a depth between about 2 feet and about 12 feet in the water at a temperature between about 40° F. and about 90° F., more preferably between about 45° F. and about 80° F., and even more preferably between about 50° F. and about 70° F. But in other embodiments, the lure body 10 may be weighted so that the assembled lure sinks or floats.

In certain embodiments, a bill (sometimes referred to as a lip) 18 extends forward from the font end 11 of the lure body 10. In embodiments where the assembled lure floats or suspends, the bill 18 preferably extends downward from the front end 11, as shown in FIGS. 1-10. When positioned this way, the bill 18 causes the lure to dive when retrieved. In other embodiments, however, the bill 18 may extend forward and upward from the front end 11, which may instead cause the lure to rise in the water column when retrieved. This configuration may be employed with embodiments where the assembled lure sinks. The shape, angle, and dimensions of the bill 18 may vary depending on the intended application of the lure. For instance, a longer bill may be employed to achieve a deeper diving depth, and a different shaped bill may be employed to increase deflection or weedlessness of the lure.

The fishing lure body 10 includes an approximately flat surface 15 located preferably on the top side 13 or bottom side 14 of the lure body 10. In embodiments where the assembled lure suspends or sinks, the approximately flat surface 15 is preferably located on the top side 13 of the lure body 10. Alternatively, in embodiments where the assembled lure floats, the approximately flat surface 15 is preferably located on the bottom side 14 of the lure body 10.

The approximately flat surface 15 comprises an area on the surface of the lure body 10 that is flat or generally flat relatively to other surfaces of the lure body 10. In some embodiments, the approximately flat surface 15 may have a slight convex or concave curve along its length, width, or both. As discussed further below, the approximately flat surface 15 may have a slight curve or contour that is complementary to the shape of the blade 20.

The approximately flat surface 15 may be of various shapes and sizes. In some embodiments, the approximately flat surface 15 is generally in the shape of a willow leaf, such as shown in FIGS. 1-10. In other embodiments, the approximately flat surface is generally circular shaped, generally ovular shaped, or generally rectangular shaped. The length and width of the approximately flat surface 15 may vary based on the size and shape of the lure body 10 and the desired amount of reflectivity. In some embodiments, the approximately flat surface 15 has a length of between about 0.5 inches and about 3 inches, more preferably between about 0.75 inches and about 2 inches, and even more preferably about 1 inch. Furthermore, the approximately flat surface 15 may have a width of between about 0.1 inches and about 0.5 inches, more preferably between about 0.2 inches and about 0.4 inches, and even more preferably about 0.3 inches. The length and width of the approximately flat surface 15 may alternatively be expressed as a proportion of the overall length and width of the lure body 10. For instance, the length of the approximately flat surface 15 may be between about one tenth and about one half of the length of the lure body 10, and more preferably between about one fifth and about one third of the length of the lure body 10. And further, the width of the approximately flat surface 15 may be between about one quarter and three quarters of the maximum width of the lure body 10, and more preferably between about one third and two thirds of the width of the lure body 10.

In some embodiments, the approximately flat surface 15 is recessed in the lure body. In these embodiments, the lure body 10 comprises a recess 16 having a base 19 and a wall. Preferably, the depth of the recess 16—that is, the distance from the base 19 to the top of the recess—is at least approximately equal to, and more preferably at least slightly greater than, the thickness of the blade 20. The approximately flat surface 15 is located at the base 19 of the recess 16.

Even more preferably, at least one retaining lip 17 extends along at least a portion of the perimeter of the recess 16. The retaining lip 17 comprises a structure that extends inward from the wall of the recess 16. Thus, in the section of the recess 16 containing the retaining lip 17, the recess 16 is slightly constricted as compared to the inner section of the recess 16 that is closer to the base 19 and approximately flat surface 15. In some embodiments, a single retaining lip 17 extends along a portion of or substantially all of the perimeter of the recess 16. In other embodiments, a plurality of retaining lips 17 extend along and are spaced around the perimeter of the recess 16.

The improved fishing lure also comprises a blade 20 affixed to the lure body 10. The blade 20 is preferably constructed from a material having a density greater than the density of the materials from which the lure body 10 is constructed. For instance, where the lure body 10 is constructed from a hard plastic or wood, the blade 20 comprises a metal. A metal blade 20 may be constructed from any suitable metal or combinations of metals. Examples of suitable materials include brass, steel, silver, nickel-plated brass, gold-plated brass, nickel-plated steel, gold-plated steel, steel metalized with nickel, steel metalized with gold, brass metalized with nickel, and brass metalized with gold. The blade 20 preferably has a polished finish or another finish that is highly lustrous, reflective, or shiny. If the blade 20 is not constructed from metal, the blade 20 may be coated with a material to provide increased sonar or visual reflectivity.

The blade 20 comprises a generally flat and thin strip of material. Preferably, the shape of the blade 20 is complementary to the shape of the approximately flat surface 15. In one exemplary embodiment, the blade 20 comprises a metal blade in the shape of a willow leaf, such as the one shown in FIGS. 1-3 and 11A-B. In other embodiments, the blade 20 comprises a blade having a generally circular shape, a generally ovular shape, or a generally rectangular shape. Similar to the approximately flat surface 15, the blade 20 may be flat or approximately flat. For instance, the blade 20 may have a slight convex or concave curve along its length, width, or both. The blade 20 preferably has dimensions, including length and width, that are substantially the same as the dimensions of the approximately flat surface 15. The length, width, and other dimensions of the blade 20 may be any of the length or width dimensions described with respect to the approximately flat surface 15, whether expressed in absolute or relative terms.

The blade 20 is affixed to the lure body 10 such that the planar surface of the blade 20 is substantially coplanar with the planar surface of the approximately flat surface 15. In other words, the blade 20 is affixed to the lure body 10 statically, meaning that the blade cannot spin or rotate. Instead, any visible flash created by the blade 20 is generated by the movement of the lure body 10, such as by the vibration, wobble, or side-to-side action generated by the lure as it is retrieved through the water. Although the blade 20 is statically affixed so that its planar surface remains coplanar with the planar surface of the approximately flat surface 15, the blade 20 may be able to move to some extent laterally or longitudinally relative to the approximately flat surface 15.

Figure 7:
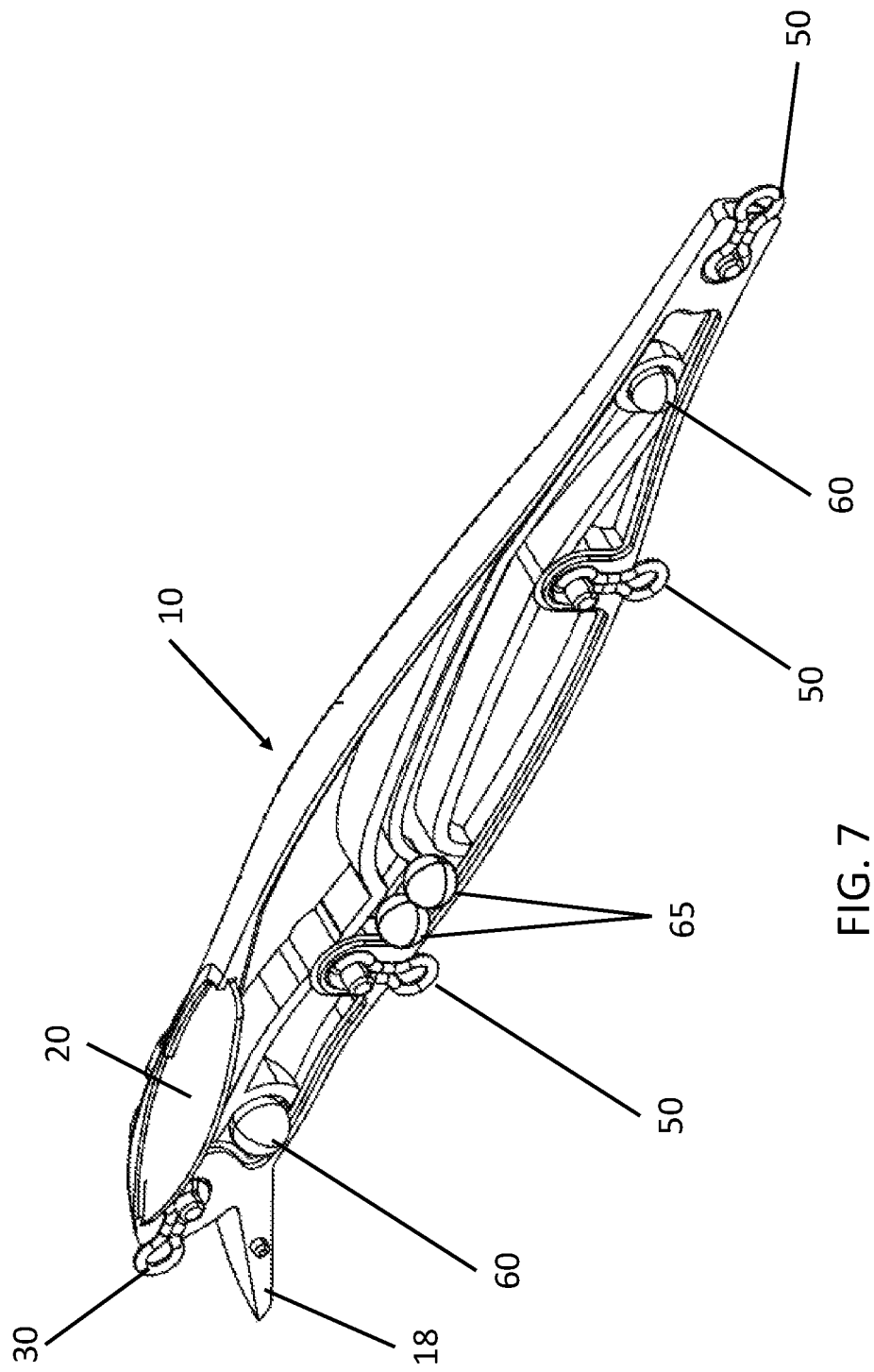
FIG. 7: A rear perspective view of one embodiment of the improved fishing lure, with one half of the fishing lure removed to show the internal detail of the fishing lure.
Figure 9:
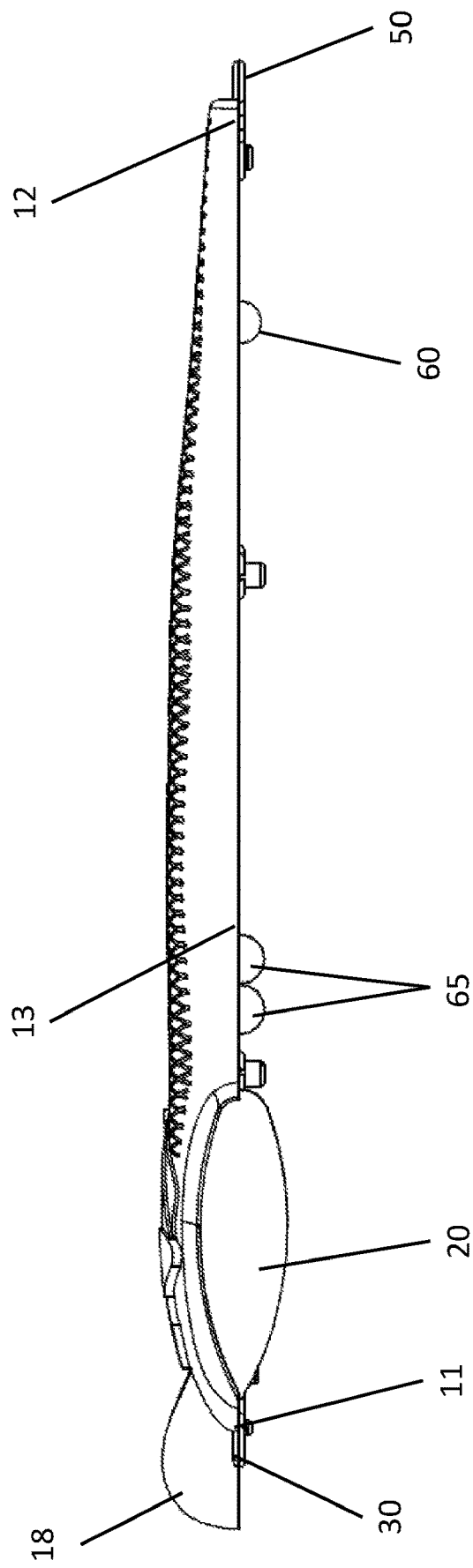
FIG. 9: A top view of one embodiment of the improved fishing lure, with one half of the fishing lure removed to show the internal detail of the fishing lure.

In embodiments where the lure body 10 comprises a recess 16 containing the approximately flat surface 15, the blade 20 is preferably dimensioned to fit within the recess 16. Furthermore, where the recess 16 comprises at least one retaining lip 17, the blade 20 preferably has dimensions that are slightly greater than the constricted opening formed by the at least one retaining lip 17. As a result, in embodiments where the lure body 10 comprises two halves that are joined together, the blade 20 may be secure by first inserting the blade into the bottom of the recess of one half of the lure body (as shown in FIGS. 7-9) and then the other half of the lure body is joined to first half and secured around the blade 20. For instance, the two halves may be sonic welded together, which locks the blade 20 in place. Alternatively, in some embodiments, the blade 20 may be inserted into the recess 16 by applying some force to pass the blade 20 beyond the retaining lip 17, after which the blade 20 cannot be easily removed from the recess 16.

The blade 20 may also be secured to the approximately flat surface 15 using alternative or additional attachment means. For instance, in some embodiments, an adhesive is applied to secure the blade 20 to the approximately flat surface 15. An adhesive may be used in addition to the one or more retaining lips 17. In different embodiments, the blade 20 may be secured to the approximately flat surface 15 using a fastener, such as a screw or bolt. In yet other embodiments, the blade 20 may be molded into place on the approximately flat surface 15.

In certain embodiments, the approximately flat surface 15 and blade 20 are positioned and oriented to further increase sonar reflectivity, in particular in connection with forward facing sonar. For instance, in embodiments where the assembled lure suspends or sinks, the approximately flat surface 15 is preferably located on the top side 13 and proximate to the front end 11 of the lure body 10. Furthermore, the approximately flat surface 15 is preferably oriented so that, when the assembled lure is at rest or retrieved through the water, the approximately flat surface 15 is angled upward between about 30 degrees and about 90 degrees relative to horizontal. The angle of the approximately flat surface 15 relative to horizontal when the assembled lure is at rest or retrieved in the water may be referred to as the float angle of the approximately flat surface 15. In some specific embodiments, the float angle of the approximately flat surface 15 is preferably between about 35 degrees and about 60 degrees, and even more preferably is at least about 40 degrees.

The desired float angle of the approximately flat surface 15 may be achieved by adjusting both the float angle of the fishing lure and the angle of the approximately flat surface 15 on the lure body 10. Thus, the float angle of the approximately flat surface 15 (or of the blade 20) May be expressed as the sum of (i) the float angle of the longitudinal axis of the assembled fishing lure, and (ii) the angle of the approximately flat surface 15 relative to the longitudinal axis of the lure body 10. In some embodiments, the float angle of the fishing lure is between about 0 degrees and about 45 degrees, is more preferably between about 10 degrees and about 40 degrees, and even more preferably between about 20 degrees and about 30 degrees. In the foregoing embodiments, the angle of the approximately flat surface 15 relatively to the longitudinal axis is between about 0 degrees and about 45 degrees, is more preferably between about 5 degrees and about 30 degrees, and even more preferably between about 10 degrees and about 20 degrees. In one specific embodiment, the approximately flat surface 15 has a float angle of between about 35 degrees and about 45 degrees, the fishing lure has a float angle of between about 25 degrees and about 35 degrees, and the approximately flat surface has an angle relative to the longitudinal axis between about 5 degrees and about 15 degrees.

Figure 10:
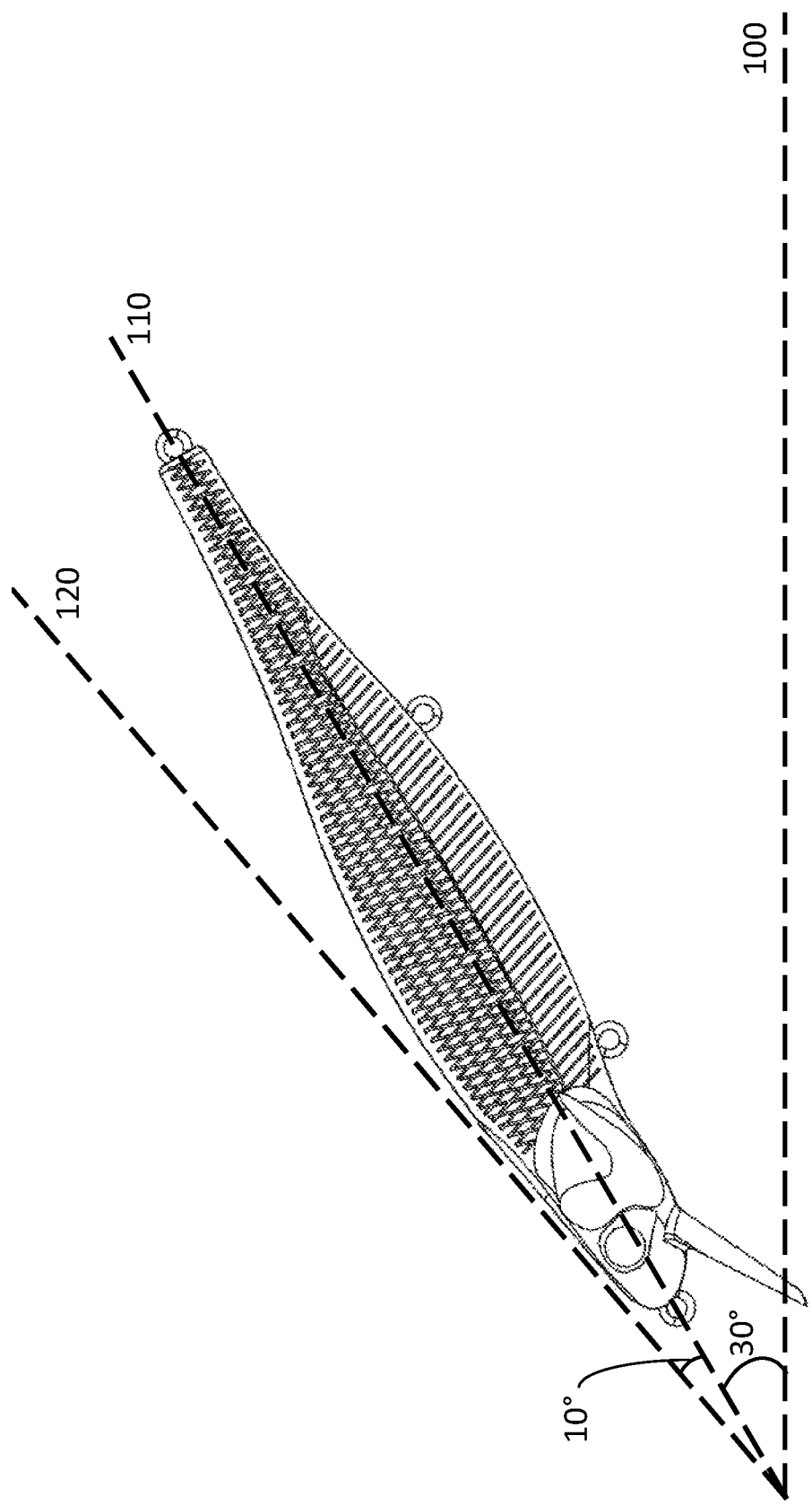
FIG. 10: A side view of one embodiment of the improved fishing lure illustrating the float angle of the longitudinal axis and the float angle of the blade.

FIG. 10 illustrates the float angles of one exemplary embodiment when the assembled lure is at rest in the water. As shown in FIG. 10, the longitudinal axis 110 has a float angle of about 30° 8 relative to horizontal 100, the approximately flat surface 15 is angled upward by approximately 10° relative to the longitudinal axis 110, and thus the approximately flat surface 15 has a float angle 120 of about 40° relative to horizontal 100.

Figure 12A:
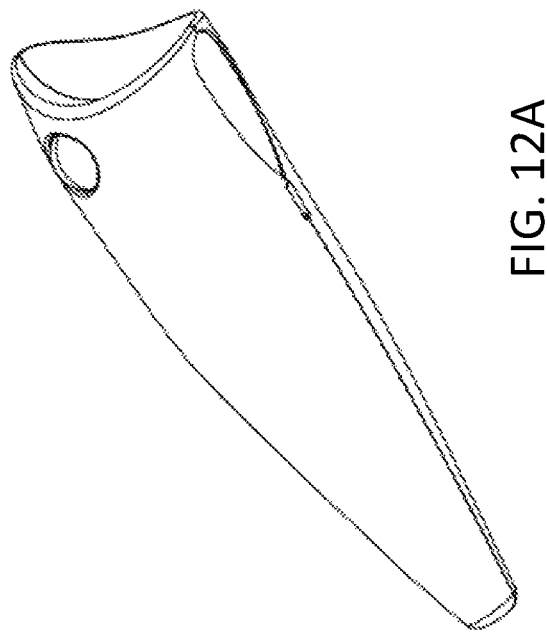
FIG. 12A: A perspective view of another embodiment of the improved fishing lure.
Figure 12B:
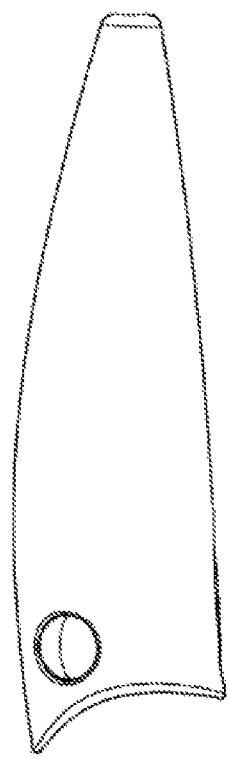
FIG. 12B: A side view of another embodiment of the improved fishing lure.
Figure 12C:
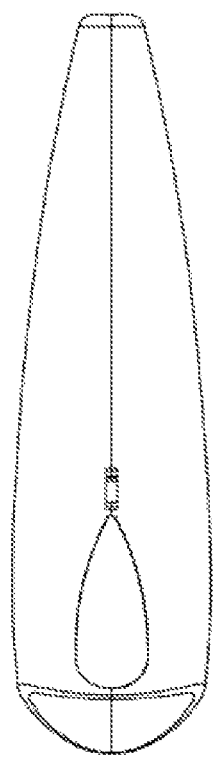
FIG. 12C: A bottom view of another embodiment of the improved fishing lure.
Figure 13A:
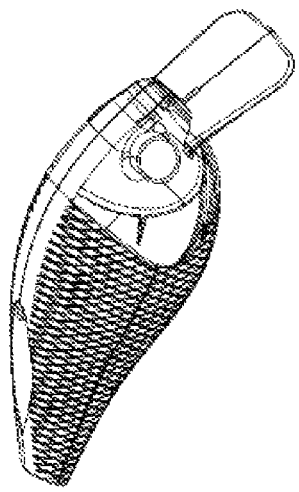
FIG. 13A: A front perspective view of yet another embodiment of the improved fishing lure.
Figure 13B:
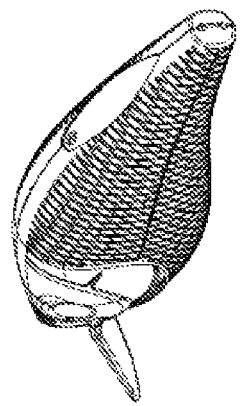
FIG. 13B: A rear perspective view of yet another embodiment of the improved fishing lure.
Figure 13C:
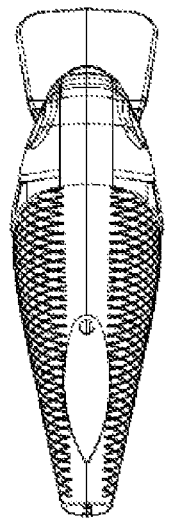
FIG. 13C: A top view of yet another embodiment of the improved fishing lure.
Figure 13D:
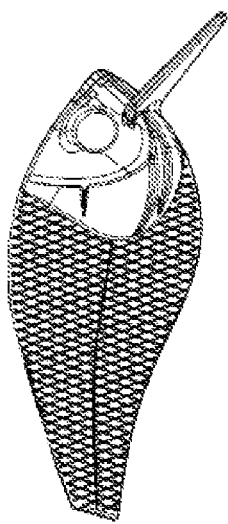
FIG. 13D: A side view of yet another embodiment of the improved fishing lure.
Figure 14A:
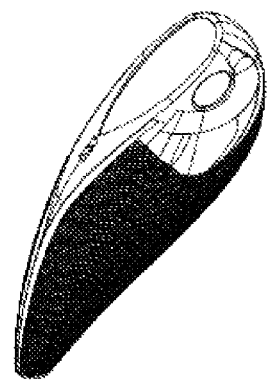
FIG. 14A: A perspective view of an alternative embodiment of the improved fishing lure.
Figure 14B:
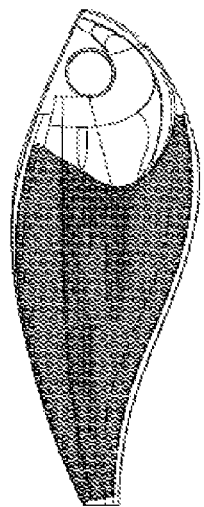
FIG. 14B: A side view of an alternative embodiment of the improved fishing lure.
Figure 14C:
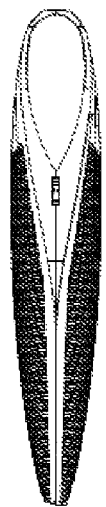
FIG. 14C: A top view of an alternative embodiment of the improved fishing lure.
Figure 15A:
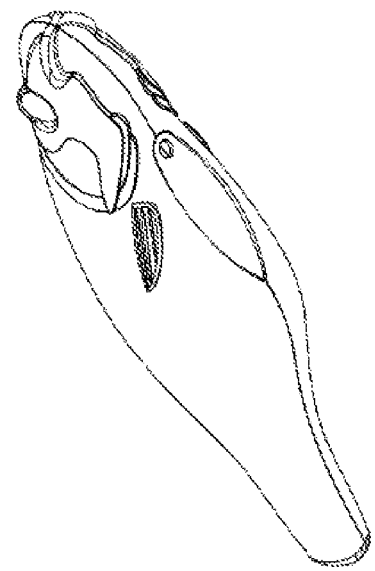
FIG. 15A: A perspective view of another alternative embodiment of the improved fishing lure.
Figure 15B:
FIG. 15B: A side view of another alternative embodiment of the improved fishing lure.
Figure 15C:
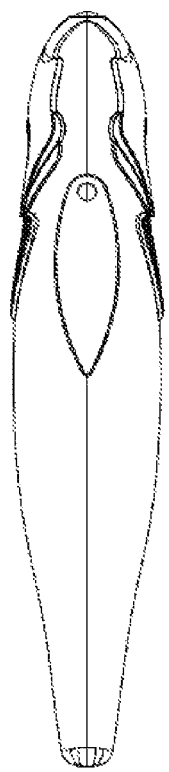
FIG. 15C: A bottom view of another alternative embodiment of the improved fishing lure.

In other embodiments, however, the approximately flat surface 15 and blade 20 may have different locations and orientations. In these embodiments, sonar reflectivity may be less of a concern while light reflectivity is of greater concern. In one other embodiment, such as the one shown in FIGS. 12A-C, the lure body is buoyant and has a shape of any various style of topwater lures. In this embodiment, the approximately flat surface 15 is preferably located on the bottom side 14 and proximate to the font end 11 of the lure body 10. In yet another embodiment, such as the one shown in FIGS. 13A-D, the lure body is buoyant and has a shape of any various style of crankbaits or other lures having a diving bill. In this embodiment, the approximately flat surface 15 is preferably located on the top side 13 and proximate to the rear end 12 of the lure body 10. In another alternative embodiment, such as the one shown in FIGS. 14A-C, the lure body sinks and has a shape of any various style of lipless or rattling lures. In this embodiment, the approximately flat surface 15 is preferably located on the top side 13 and proximate to the front end 11 of the lure body 10. In another alternative embodiment, such as the one shown in FIGS. 15A-C, the lure body slowly sinks and has a minnow shaped body. In this embodiment, the approximately flat surface 15 is preferably located around approximately the midpoint of the bottom side 14 of the lure body 10.

While the foregoing specification has described specific embodiments of this invention and many details have been put forth for the purpose of illustration, it will be apparent to those skilled in the art that the invention is susceptible to additional embodiments and that certain of the details described herein can be varied considerably without departing from the basic principles of the invention.

We claim:

1. A fishing lure comprising:
   a fishing lure body having a front end, a rear end, a top side, and a bottom side, wherein said fishing lure body comprises an approximately flat surface on said top side and proximate to said front end;
   a bill extending forward and downward from said front end;
   at least one hook extending from said rear end or said bottom side;
   a line tie extending from said fishing lure body proximate to said front end; and
   a metal blade statically affixed to said approximately flat surface.

2. The fishing lure of claim 1, wherein said approximately flat surface is recessed in said fishing lure body.

3. The fishing lure of claim 1, wherein said fishing lure body comprises a recess having a wall and a base, wherein said approximately flat surface is at the base of said recess, and wherein around a portion of the perimeter of said recess at least one lip extends inward from the wall of said recess.

4. The fishing lure of claim 3, wherein said metal blade is disposed in said recess and below said at least one lip.

5. The fishing lure of claim 1, wherein said approximately flat surface has a float angle between about 30 degrees and about 90 degrees relative to horizontal.

6. The fishing lure of claim 5, wherein said float angle is between about 35 degrees and about 45 degrees relative to horizontal.

7. The fishing lure of claim 1, wherein said fishing lure body has a longitudinal axis and said longitudinal axis has a float angle between about 0 degrees and about 45 degrees, and wherein said approximately flat surface has an angle relative to said longitudinal axis between about 0 degrees and about 45 degrees.

8. The fishing lure of claim 7, wherein the sum of said float angle of said longitudinal axis and said angle of said approximately flat surface relative to said longitudinal axis is between about 30 degrees and about 90 degrees.

9. The fishing lure of claim 1, wherein the length of said metal blade is between about one tenth and about one half of the length of said fishing lure body.

10. The fishing lure of claim 1, wherein the length of said approximately flat surface is between about 0.5 inches and about 3 inches.

11. The fishing lure of claim 1, wherein said fishing lure body comprises acrylonitrile butadiene styrene (ABS), polycarbonate, polypropylene, or butyrate.

12. A fishing lure comprising:
a fishing lure body having a front end, a rear end, a top side, and a bottom side, wherein said fishing lure body comprises an approximately flat surface on said top side or said bottom side;
at least one hook extending from said rear end or said bottom side;
a line tie extending from said fishing lure body proximate to said front end; and
a metal blade affixed to said approximately flat surface, wherein the planar surface of said metal blade is substantially coplanar with the planar surface of said approximately flat surface.

13. The fishing lure of claim 12, wherein said approximately flat surface is recessed in said fishing lure body.

14. The fishing lure of claim 12, wherein said fishing lure body comprises a recess, wherein said approximately flat surface is at the base of said recess, and wherein at least one lip extends around a portion of the perimeter of said recess.

15. The fishing lure of claim 14, wherein said metal blade is affixed in said recess below said at least one lip.

16. The fishing lure of claim 12, wherein said fishing lure body comprises plastic or wood.

17. The fishing lure of claim 12, further comprising:
a bill extending forward and downward from said front end of said fishing lure body,
wherein said approximately flat surface is on said top side of said fishing lure body.

18. The fishing lure of claim 17, wherein said approximately flat surface is proximate to said front end of said fishing lure body.

19. The fishing lure of claim 17, wherein said approximately flat surface is proximate to said rear end of said fishing lure body.

20. The fishing lure of claim 12, wherein said fishing lure body is buoyant, and wherein said approximately flat surface is on said bottom side of said fishing lure body and proximate to said front end.

* * * * *